United States Patent [19]

Hosono

[11] Patent Number: 5,019,816
[45] Date of Patent: May 28, 1991

[54] DECODING APPARATUS FOR DIGITAL SIGNAL

[75] Inventor: Yoshimasa Hosono, Kanagawa, Japan

[73] Assignee: Sony Corporation, Tokyo, Japan

[21] Appl. No.: 543,445

[22] Filed: Jun. 26, 1990

[30] Foreign Application Priority Data

Jun. 27, 1989 [JP] Japan ................................. 1-165030

[51] Int. Cl.$^5$ .............................................. H03M 7/32
[52] U.S. Cl. ...................................... 341/77; 341/143; 360/51; 360/70; 360/73.01
[58] Field of Search ..................... 341/77, 143; 360/51, 360/70, 73.01

[56] References Cited

U.S. PATENT DOCUMENTS

| | | | |
|---|---|---|---|
| 3,916,107 | 10/1975 | McDonald | 341/77 |
| 3,916,314 | 10/1975 | Franaszck et al. | 341/143 |
| 4,348,699 | 9/1982 | Tsuchiya et al. | 360/51 |
| 4,636,875 | 1/1987 | Scholz | 360/51 |
| 4,636,877 | 1/1987 | Ido | 360/51 |
| 4,677,503 | 6/1987 | Nagasawa et al. | 360/70 |
| 4,805,046 | 2/1989 | Kuroki et al. | 360/51 |
| 4,825,403 | 4/1989 | Gershenson et al. | 360/51 |

Primary Examiner—William M. Shoop, Jr.
Assistant Examiner—Nancy Le
Attorney, Agent, or Firm—Hill, Van Santen, Steadman & Simpson

[57] ABSTRACT

A decoding apparatus comprises detecting circuit for detecting a leading edge of a request signal which requests transmission of sequential data as digital signal, clock generator for generating a clock signal in response to an output signal from detecting circuits, and decoding circuit for decoding sequential data in accordance with the clock signal.

8 Claims, 4 Drawing Sheets

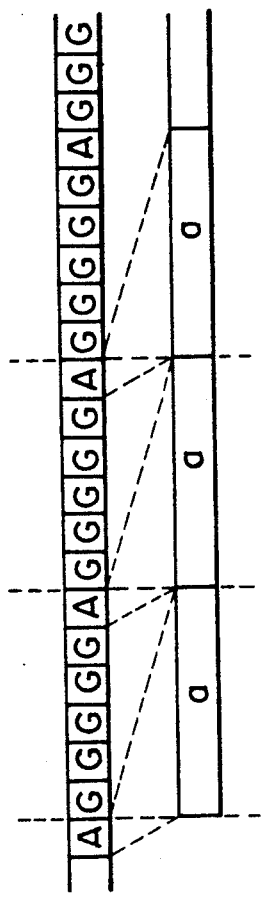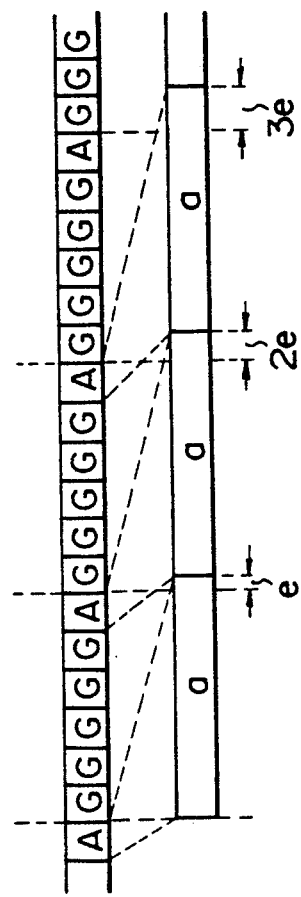
Fig. 1A
Fig. 1B
Fig. 2A
Fig. 2B

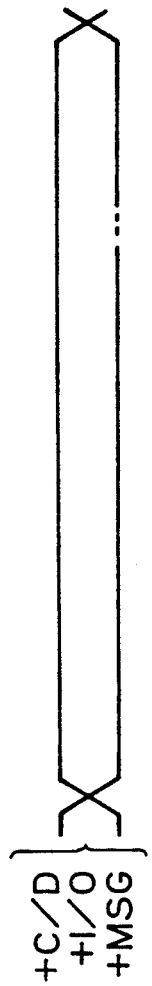
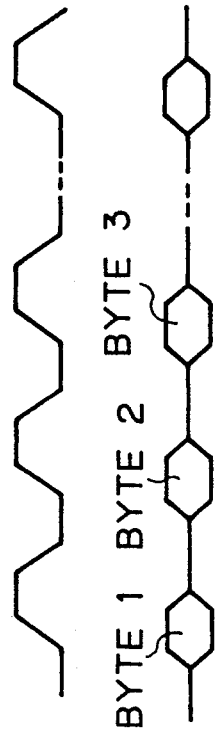
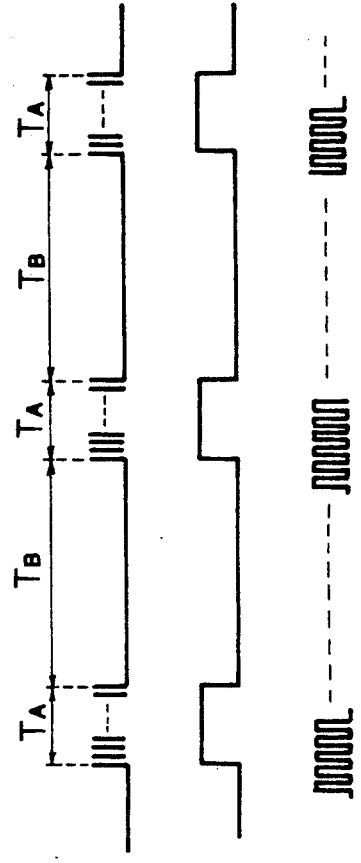
Fig. 5A
Fig. 5B
Fig. 5C
Fig. 5D
Fig. 6A
Fig. 6B
Fig. 6C

DECODING APPARATUS FOR DIGITAL SIGNAL

BACKGROUND OF THE INVENTION

1. Field of the Invention

This invention relates to a decoding apparatus for digital signal, particularly suited for decoding reproduction data of a CD-ROM on which sequential data is recorded.

2. Description of the Prior Art

A CD-ROM for recording digital data on an optical disc of a shape similar to a compact disc for music has been attracting attention as a recording medium for large-capacity data. The CD-ROM is suitable for real-time application programs which operate sequential data such as music data or picture data, since CD-ROM can record such long-time sequential data.

For this reason, the standards for recording music data or picture data using a CD-ROM, for example, the CD-I and the CD-ROM XA have been proposed. With such recording of music data or picture data onto the CD-ROM, man-machine interface is improved using a voice or an animated picture, and voice mail or picture mail using computer can be achieved. Besides, the realization of various services using the CD-I or CD-ROM has been expected.

For handling CD-ROM application programs, a CD-ROM disc driver and a CD-ROM decoder for reproducing the CD-ROM are needed, in addition to a host computer.

The CD-ROM disc driver capable of using real-time application programs is conventionally constructed so that it is connected to the CD-ROM decoder using a special standard interface. This is because to make strictly equal the speed of reproduced data and the speed of decoding data is needed in the real-time application.

In recent years, the SCSI (Small Computer System Interface) is frequently employed for the connection between a computer and peripheral equipment. Based on this background, in the market, there is strong demand for the connection of a CD-ROM disc driver and a CD-ROM decoder using the SCSI bus.

However, in principle, the SCSI bus cannot transmit a signal corresponding to the read-out speed of reproduced data from a recording medium. Therefore, it is difficult to make the reproduction data speed equal to the decoding speed strictly. For this reason, it is thought that the SCSI bus cannot connect the CD-ROM disc driver and the CD-ROM decoder conventionally.

Namely, when a signal corresponding to the speed of reproduction data cannot be transmitted, the CD-ROM disc driver and the CD-ROM decoder operate with their own clocks. In the case where the CD-ROM disc driver and the CD-ROM decoder are operated by their own clocks, it is impossible to make completely equal the playback time of the CD-ROM and the decoding time of the CD-ROM decoder.

Data is continuously reproduced from the CD-ROM, and the continuous data is decoded from the CD-ROM decoder. Consequently, even if there is a slight speed error between the speed of reproduced data and the decoding speed, the error is accumulated after long hours of playback.

As a result, when a CD-ROM which has recorded music data and picture data is played back, sound leaping or a time difference between the reproduced picture and the reproduced sound may take place.

For example, as shown in FIG. 1A, it is assumed that a disc which has recorded compressed audio data A and graphic data G is reproduced. At this time if the speed of reproduced data and the decoding speed coincide with each other, a reproduced and time-base expanded audio signal a coincides with a corresponding reproduced picture as shown in FIG. 1B.

On the other hand, FIG. 2 shows a case where there is a speed error between the reproduced data speed and the decoding speed. As indicated in FIG. 2A, when the disc which has recorded the compressed audio data A and the graphic data G is reproduced, the reproduced and time-base expanded audio signal a does not coincide with the corresponding reproduced picture as shown in FIG. 2B if there is an error between the reproduced data speed and the decoding speed. The error e is accumulated with the advance of the playback time.

OBJECTS AND SUMMARY OF THE INVENTION

It is, therefore, an object of the present invention to provide a decoding apparatus for digital signal enabling the connection with a CD-ROM disc driver using the SCSI bus, for instance.

According to an aspect of the invention, there is provided a decoding apparatus for digital signal comprising:

detecting means for detecting a leading edge of a request signal which requests transmission of sequential data as digital signal;

clock generator for generating a clock signal in response to an output signal from detecting means; and decoding circuit for decoding sequential data in accordance with the clock signal.

The above, and other, objects, features and advantages of the present invention will become readily apparent from the following detailed description thereof which is to be read in connection with the accompanying drawings.

BRIEF DESCRIPTION OF THE DRAWINGS

FIGS. 1 and 2 are diagrams of timing for explaining a conventional decoder;

FIG. 5 is a diagram of timing for describing the SCSI;

FIG. 6 is a diagram of timing for explaining one example of a clock developing circuit in one embodiment of the invention.

DETAILED DESCRIPTION OF THE PREFERRED EMBODIMENTS

Figure 3:
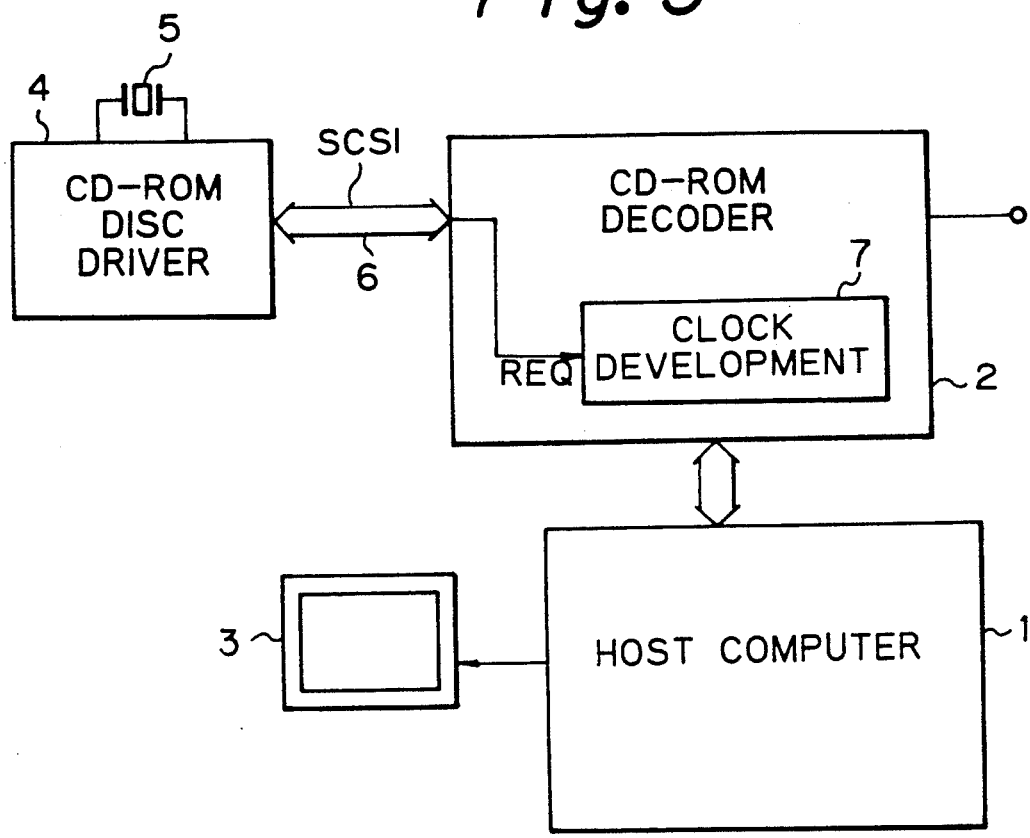
FIG. 3 is a block diagram of one embodiment of this invention.

Hereunder, one embodiment of the invention will be described referring to the drawings.

The invention is suitable for use in a CD-ROM decoder of the CD-ROM XA standards, for example. In the CD-ROM XA, voice data is recorded by ADPCM (adaptive differential pulse-code modulation).

In FIG. 3, 1 is a host computer, 2 is a CD-ROM decoder. The host computer 1 and the CD-ROM decoder 2 are connected to each other. A CRT display 3 is connected to the host computer 1.

4 is a CD-ROM disc driver. The CD-ROM disc driver 4 operates by a clock from a clock generating circuit 5. The CD-ROM driver 4 and the CD-ROM decoder 2 are connected through an SCSI interface 6.

A clock developing circuit 7 is provided at the CD-ROM decoder 2. In the clock developing circuit 7, a clock is developed using an REQ signal sent from the side of the CD-ROM disc driver 4. At the CD-ROM decoder 2, a decoding operation is performed using a clock signal formed by the clock developing circuit 7. With the clock developed at the clock developing circuit 7, the disc reproduction speed of the CD-ROM disc driver 4 and the decoding speed of the CD-ROM decoder 2 can be made completely equal.

Figure 4:
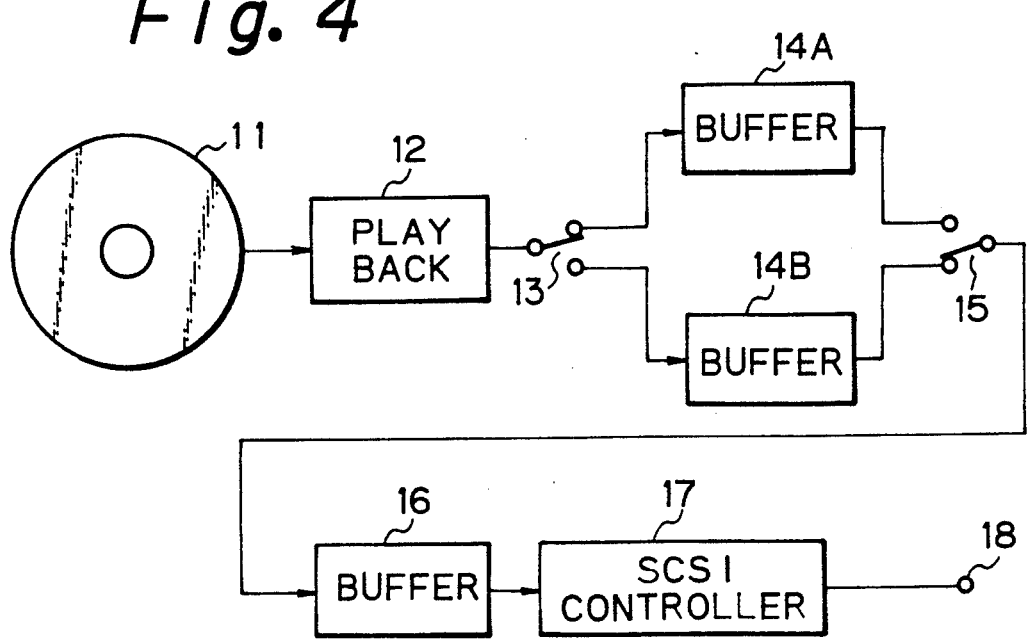
FIG. 4 is a block diagram of one example of a CD-ROM disc driver in one embodiment of the invention.

The CD-ROM disc driver 4 can be constructed as shown in FIG. 4, for instance.

In FIG. 4, a reproduced signal from a disc 11 is supplied to a playback circuit 12. At the playback circuit 12, processing such as EFM modulation, error correction, etc. is made to decode reproduced data.

The output of the playback circuit 12 is supplied to buffer memories 14A and 14B through a switch circuit 13. The switch circuit 13 is switched with 75 Hz, for example.

The buffer memories 14A and 14B are controlled so that when one is in a write-in state, the other is brought to be in a read-out state. Data is written into the buffer memories 14A and 14B by the data rate of reproduced data (for instance, 170 k bytes/second), and data is read out therefrom by the data rate of the SCSI bus (for example, 1M byte/second). Data transfer rate conversion is made by the buffer memories 14A and 14B.

The output of the buffer memories 14A and 14B are fed to a buffer memory 16 through a switch circuit 15. The switch circuit 15 is switched with 75 Hz, for instance.

The output of buffer memory 16 is given to an SCSI controller 17. Data is sent from the SCSI controller 17 through an SCSI port 18.

FIG. 5 shows an information transfer phase in the SCSI bus. By a combination of each signal (FIG. 5A) of C/D, I/O and MSG, the kind of the information transfer phase to perform is designated. When the transfer is done in an asynchronous mode in the SCSI bus, the transfer is performed while confirming an REQ signal (FIG. 5B) and an ACK signal (FIG. 5C). Clearly, on the side of the CD-ROM disc driver 4, the REQ signal is sent after establishing the value of a data bus (FIG. 5D). When data is received on the side of the CD-ROM decoder 2, the ACK signal (FIG. 5C) is sent back. The value of the data bus is held until the ACK signal is received on the side of the CD-ROM disc driver 4.

Basically, the SCSI bus has not transferred a signal corresponding to a read-out speed from a disc. For this reason, conventionally, it is impossible to connect the CD-ROM disc driver 4 and the CD-ROM decoder 2 through the SCSI bus 6.

In one embodiment of the invention, a clock is developed using the REQ signal at the clock developing circuit 7 of the CD-ROM decoder 2. With this, the disc reproduction speed of the CD-ROM disc driver 4 and the decoding speed of the CD-ROM decoder 2 can be made completely equal. For this reason, it is possible to connect the CD-ROM disc driver 4 and the CD-ROM decoder 2 through the SCSI bus 6.

Data rate conversion is executed in the buffer memories 14A and 14B (FIG. 4) of the CD-ROM disc driver 4, and the transmission rate of data sent through the SCSI bus 6 is higher than the playback transmission rate at the CD-ROM disc driver 4. As a result, as shown in FIG. 6A, there occur an interval $T_a$ where data is sent via the SCSI bus 6 and an interval $T_b$ where the data transfer is stopped. The REQ signal is sent each time data is transferred in the interval $T_a$ where data is sent via the SCSI bus 6. Therefore, in response to a detection of the REQ signal, the interval $T_a$ where the data is sent and the interval $T_b$ where the data transfer is stopped can be detected. The interval $T_a$ where the data is sent and the interval $T_b$ where the data transfer is stopped are switched by a signal based on the clock on the side of the CD-ROM disc driver 4. Namely, the interval $T_a$ where the data is sent and the interval $T_b$ where the data transfer is stopped are set by the signal of 75 Hz for switching the switching circuits 13 and 15 on the side of the CD-ROM disc driver 4. From this, by the detection of the interval $T_a$ where the data is sent and the interval $T_b$ where the data transfer is stopped, information based on the playback speed on the side of the CD-ROM disc driver 4 can be provided.

Figure 7:
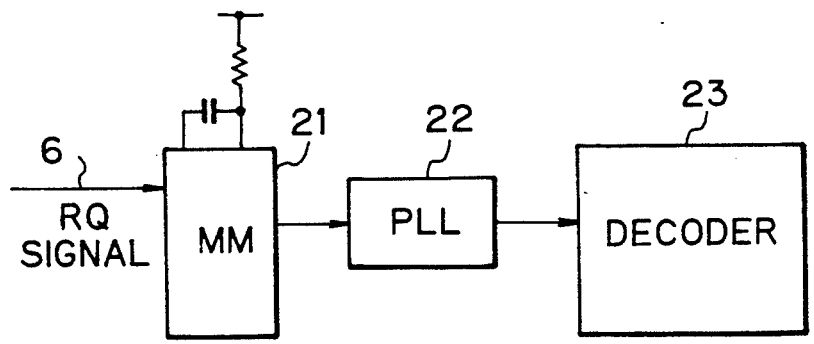
FIG. 7 is a block diagram of one example of the clock developing circuit in one embodiment of the invention.

The clock developing circuit 7 at the CD-ROM decoder 2 is constructed as shown in FIG. 7 to detect the REQ signal to develop a clock.

Clearly, in FIG. 7, the REQ signal (FIG. 6A) is sent from the side of the CD-ROM disc driver 4 through the SCSI bus 6. The REQ signal is supplied to a monostable multi-vibrator 21.

The monostable multi-vibrator 21 is triggered by the REQ signal. As a result, signals corresponding to the interval $T_a$ where the data is sent and the interval $T_b$ where the data transfer is stopped are provided from the monostable multi-vibrator 21 as shown in FIG. 6B.

The output of the monostable multi-vibrator 21 is given to a PLL 22. A clock with a predetermined frequency, which is in synchronism with the output of a monostable multi-vibrator 21 is provided at the PLL 22 as shown in FIG. 6C. The clock is supplied to a CD-ROM decoder 23. The clock corresponds to an operating clock of the CD-ROM disc driver 4. Consequently, if the decoding operation of the CD-ROM decoder 2 is done by the clock provided from the clock developing circuit 7, the disc playback speed of the CD-ROM disc driver 4 and the decoding speed of the CD-ROM decoder 2 can be made completely equal.

The invention is not limited to the case of the use of the SCSI and is applicable to the case where another interface is employed to send a signal for requesting a data transfer in the transmission of data.

According to the invention, a clock is developed using the REQ signal sent corresponding to a data transfer, and the decoding operation is done using the clock. For this reason, the disc playback speed of the CD-ROM disc driver and the decoding speed of the CD-ROM decoder can be made completely equal. As a result, it becomes possible to connect the CD-ROM disc driver and the decoder using the SCSI bus.

What is claimed is:
1. A decoding apparatus for digital signal comprising:
  detecting means for detecting a leading edge of a request signal which requests transmission of sequential data as digital signal;
  clock generator for generating a clock signal in response to output signal from said detecting means; and
  (decoding circuit for decoding sequential data in accordance with the clock signal.

2. A decoding apparatus for digital signal according to claim 1, wherein said sequential data is recorded on a recording medium.

3. A decoding apparatus for digital signal according to claim 2, wherein said recording medium is an optical disc.

4. A decoding apparatus for digital signal according to claim 3, wherein said optical disc is a CD-ROM, and said sequential data is composed of audio signal as a data of ADPCM.

5. A decoding system for digital data comprising:
recording medium driver comprising;
playback means for playing back digital data from a recording medium, and
means for generating a request signal requesting transmission of the digital data,
decoding means comprising;
detecting means for detecting a leading edge of the request signal,
clock generator for generating a clock signal in response to an output signal from said detecting means, and
decoding circuit for decoding the sequential data in accordance with the clock signal; and
interface line for connecting said recording medium driver with said decoding means and for transmitting the digital data and the request signal.

6. A decoding system for digital signal according to claim 5, wherein said decoding apparatus generates an acknowledge signal when it receives the digital data and said recording medium driver holds a condition of data bus until it receives the acknowledge signal.

7. A decoding system for digital signal according to claim 6, wherein the acknowledge signal is transmitted through said interface line.

8. A decoding system for digital signal according to claim 5, wherein said interface line is SCSI.

* * * * *